(12) United States Patent
Jeong et al.

(10) Patent No.: US 10,129,021 B2
(45) Date of Patent: Nov. 13, 2018

(54) PHOTON PAIR GENERATOR AND QUANTUM CRYPTOGRAPHY SYSTEM EMPLOYING THE SAME

(71) Applicant: SAMSUNG ELECTRONICS CO., LTD., Suwon-si (KR)

(72) Inventors: Heejeong Jeong, Suwon-si (KR); Jisoo Kyoung, Seoul (KR); Changwon Lee, Hwaseong-si (KR); Chanwook Baik, Yongin-si (KR); Yeryoung Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/684,513

(22) Filed: Apr. 13, 2015

(65) Prior Publication Data
US 2016/0094342 A1 Mar. 31, 2016

(30) Foreign Application Priority Data

Sep. 30, 2014 (KR) .................. 10-2014-0132013

(51) Int. Cl.
*H04L 9/08* (2006.01)
*H04B 10/70* (2013.01)

(52) U.S. Cl.
CPC ........... *H04L 9/0852* (2013.01); *H04B 10/70* (2013.01)

(58) Field of Classification Search
CPC .............................. H04L 9/0852; H04B 10/70
See application file for complete search history.

(56) References Cited

U.S. PATENT DOCUMENTS

| | | | |
|---|---|---|---|
| 8,073,336 B2 | 12/2011 | Trifonov | |
| 8,189,966 B2* | 5/2012 | Peev | H04L 9/0858 380/256 |
| 8,554,022 B1* | 10/2013 | Hochberg | H01L 29/66977 257/21 |
| 2005/0259252 A1 | 11/2005 | Hillenbrand et al. | |
| 2008/0273565 A1* | 11/2008 | Gmachl | B82Y 20/00 372/45.012 |
| 2012/0051740 A1* | 3/2012 | Arahira | H04B 10/70 398/28 |
| 2013/0301094 A1 | 11/2013 | Gilbert et al. | |

OTHER PUBLICATIONS

S. S. R. Oemrawsingh, "Two-dimensional wave-vector correlations in spontaneous parametric downconversion explored with an intensified CCD camera", 2002, p. 5.*

Mikhail Tokman, "Generation of Entangled Photons in Graphene in a Strong Magnetic Field", 2013, pp. 5.*

(Continued)

*Primary Examiner* — Wasika Nipa
(74) *Attorney, Agent, or Firm* — Sughrue Mion, PLLC

(57) ABSTRACT

A photon pair generator includes a light source configured to emit light, and a nonlinear optical element configured to receive the light radiated from the light source and generate a quantum-entangled photon pair through spontaneous parametric down-conversion (SPDC), the nonlinear optical element including a polar material layer and a nonlinear material layer provided on the polar material layer.

15 Claims, 7 Drawing Sheets

(56) References Cited

OTHER PUBLICATIONS

Noh, et al., "Quantum Cryptography", Electronics and Telecommunication Trends vol. 20, No. 5, (Oct. 2005), total 15 pages.
Gan, et al., "Chip-integrated ultrafast graphene photodetector with high responsivity", Nature Photonics, vol. 7, Nov. 2013, Published online Sep. 15, 2013, pp. 883-887.
Pospischil, et al., "CMOS-compatible graphene photodetector covering all optical communication bands", Nature Photonics, vol. 7, Nov. 2013, Published online Sep. 15, 2013, pp. 892-896.
Ekert, et al., "Quantum Cryptography Based on Bell's Theorem", Physical Review Letters, vol. 67, No. 6, Aug. 5, 1991, pp. 661-663.
Wang, et al., "High-responsivity graphene/silicon-heterostructure waveguide photodetectors", Nature Photonics, vol. 7, Nov. 2013, Published online Sep. 15, 2013, pp. 888-891.
OKI website, OKI develops the world's purest quantum entangled light source and establishes practical, next-generation quantum cryptography technologies, https://www.oki.com/en/press/2012/02/z11104e.html, Feb. 21, 2012, total 3 pages.
Ladd, et al., "Quantum computers", Nature, vol. 464, Mar. 4, 2010, pp. 45-53.
M.M. Glazov, "Second Harmonic Generation in Graphene", [cond-mat.mes-hall] Jan. 14, 2011, pp. 1-5.
T. D. Ladd, et al., "Quantum computers", Nature, vol. 464, Mar. 4, 2010, pp. 45-53.
Artur K. Ekert, "Quantum Cryptography Based on Bell's Theorem", Physical Review Letters, vol. 67, No. 6, Aug. 5, 1991, The American Physical Society, pp. 661-663.
Paul G. Kwiat, et al., "New High-Intensity Source of Polarization-Entangled Photon Pairs", Physical Review Letters, vol. 75, No. 24, Dec. 11, 1995, total 6 pages.

\* cited by examiner

PHOTON PAIR GENERATOR AND QUANTUM CRYPTOGRAPHY SYSTEM EMPLOYING THE SAME

CROSS-REFERENCE TO RELATED APPLICATION

This application claims the benefit of Korean Patent Application No. 10-2014-0132013, filed on Sep. 30, 2014, in the Korean Intellectual Property Office, the disclosure of which is incorporated herein in its entirety by reference.

BACKGROUND

1. Field

The exemplary embodiments relate to a photon pair generator and a quantum cryptography system employing the same.

2. Description of the Related Art

Recently, as wired/wireless communication technology has rapidly advanced and various communication services have come into widespread use, security for communication networks has arisen as a very important issue. In particular, the importance of security for communication networks has increased more and more for protection of secrets related to countries, companies, and finance and personal information. Quantum cryptography has recently drawn much attention as a security solution for communication. Quantum cryptography is a communication security technology whereby security is guaranteed based on the principles of quantum mechanics that are basic rules of nature, thereby preventing wiretapping or monitoring. That is, quantum cryptography is technology whereby a secret key that may be used to encrypt and decrypt data to be exchanged between a transmitting side and a receiving side is distributed in an absolutely secure manner based on the laws of quantum physics such as the no-cloning theorem. Quantum cryptography has been also known as quantum key distribution (QKD) technology.

Representative examples of quantum cryptography or a quantum key distribution method include the BB84 protocol, B92 protocol, EPR protocol, etc. Many quantum cryptography protocols including the BB84 protocol employ a method of using a single-photon state. An ideal single-photon state refers to a state in which only one photon is present in a predetermined mode. The ideal single-photon state cannot be perfectly realized using current technology.

Recently, in the field of quantum information technology, not only the method using the single-photon state but also a method of using a quantum-entangled state in quantum cryptography communication has been frequently used. Since bulky three-dimensional (3D) nonlinear crystals have been mainly used to produce the quantum-entangled state, the quantum-entangled state is difficult to apply to small-sized integrated photonic chips.

SUMMARY

Provided are a photon pair generator for generating a quantum-entangled photon pair and a quantum cryptography system employing the same.

Additional aspects will be set forth in part in the description which follows and, in part, will be apparent from the description, or may be learned by practice of the presented exemplary embodiments.

According to an aspect of an exemplary embodiment, there is provided a photon pair generator including a light source configured to emit light; and a nonlinear optical element configured to receive the light radiated from the light source and generate a quantum-entangled photon pair through spontaneous parametric down-conversion (SPDC), the nonlinear optical element including a polar material layer and a nonlinear material layer provided on the polar material layer.

The nonlinear material layer may include a graphene sheet or organic crystals.

The polar material layer may be formed of an insulating material.

The polar material may include a metal layer.

The polar material layer may include a waveguide.

The waveguide may include a core portion and a cladding portion having a refractive index that is different from a refractive index of the core portion, and surrounding the core portion.

The polar material layer may include a substrate and a waveguide provided on a portion of a surface of the substrate. The nonlinear material layer may be provided along portions of the surface of the substrate other than the portion of the surface of the substrate on which the waveguide is formed, and may be further provided along external surfaces of the waveguide.

The light source may be a vertical cavity surface-emitting laser.

The light source and the nonlinear optical element may be integrally formed in an integrated all-in-one chip.

According to an aspect of another exemplary embodiment, there is provided an electronic device including the photon pair generator according to an exemplary embodiment.

According to an aspect of another exemplary embodiment, there is provided a quantum cryptographic system including the photon pair generator according to an exemplary embodiment; and a first measuring system and a second measuring system configured to receive the first photon and the second photon, respectively.

Each of the first measuring system and the second measuring system may include an optical path division module configured to divide paths of incident photons; a photodetector configured to detect a photon being transmitted along one of the divided paths, and thereby generate a detection result; and a signal processor configured to generate bit values corresponding to the detection result.

The photodetector may include an avalanche photodiode.

The photon pair generator may further include an optical modulator provided between the light source and the nonlinear optical element and configured to modulate the light emitted from the light source.

The photon pair generator may further include an interferometer configured to control an entangled state of the quantum-entangled photon pair generated by the nonlinear optical element.

The photon pair generator may be further configured to generate a polarization-entangled photon pair.

The photon pair generator may be further configured to generate a frequency-entangled photon pair.

The photon pair generator may be further configured to generate a time-energy entangled photon pair.

The first measuring system may be a system of a local user, and the second measuring system may be a system of a remote user. The system may further include a time controller configured to enable the first measuring system and the second measuring system to select the same bit values with respect to the first photon and the second photon.

The first measuring system and the photon pair generator may be provided in a first electronic device, and the second measuring system may be provided in a second electronic device spaced apart from the first electronic device.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
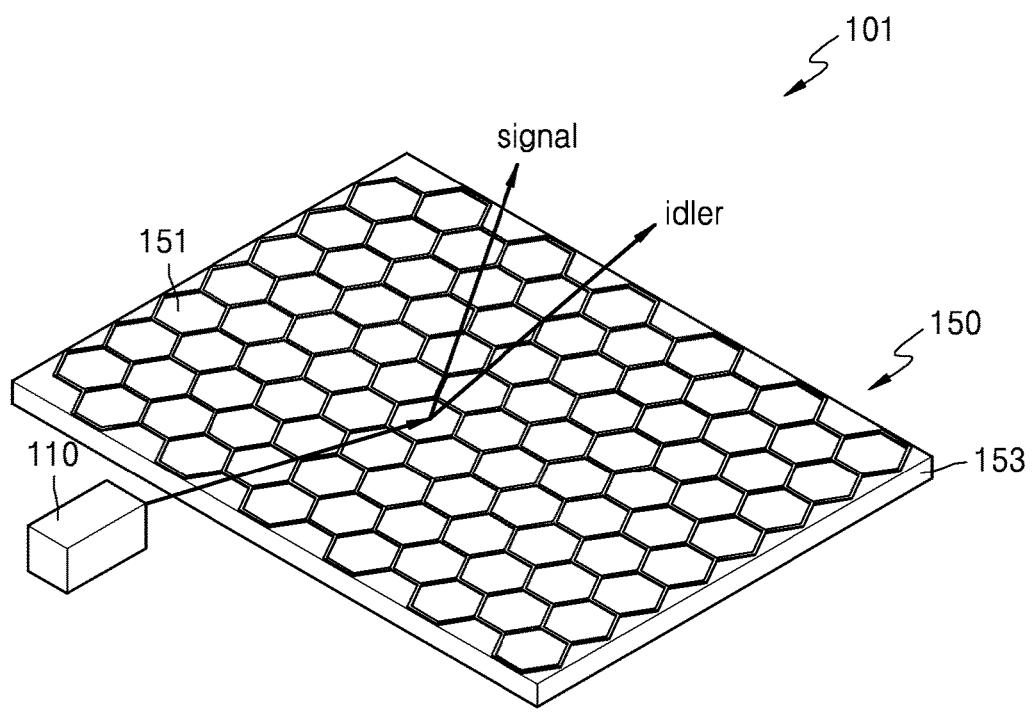
FIG. 1 is a diagram illustrating a schematic structure of a photon pair generator according to an exemplary embodiment.

Reference will now be made in detail to exemplary embodiments, examples of which are illustrated in the accompanying drawings, wherein like reference numerals refer to like elements throughout. In the drawings, the lengths and sizes of layers and regions may be exaggerated for clarity. In this regard, the present exemplary embodiments may have different forms and should not be construed as being limited to the descriptions set forth herein. Accordingly, the exemplary embodiments are merely described below, by referring to the figures, to explain various aspects thereof.

It will be understood that when an element or layer is referred to as being "on" another element or layer, the element or layer can be directly on another element or layer or intervening elements or layers.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2A:
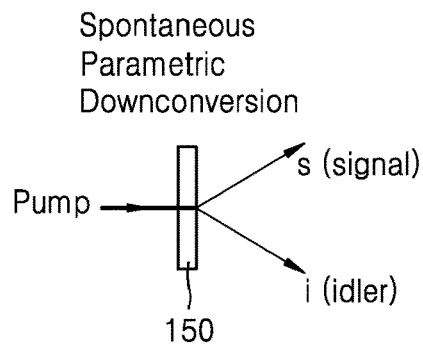
FIGS. 2A, 2B and 2C are conceptual diagrams illustrating principles of generating a pair of photons by using a photon pair generator according to an exemplary embodiment.
Figure 2B:
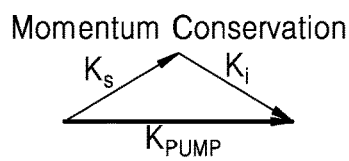
Figure 2C:
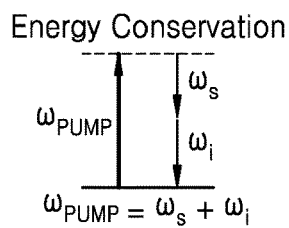

FIG. 1 is a diagram illustrating a schematic structure of a photon pair generator 101 according to an exemplary embodiment. FIGS. 2A, 2B and 2C are conceptual diagrams illustrating principles of generating a pair of photons by using a photon pair generator 101 according to an exemplary embodiment.

The photon pair generator 101 includes a light source 110, and a nonlinear optical element 150 that receives light radiated from the light source 110 and generates a quantum-entangled photon pair through spontaneous parametric down-conversion (SPDC). The nonlinear optical element 150 includes a polar material layer 153, and a nonlinear material layer 151 formed on the polar material layer 153. The nonlinear material layer 151 may include a graphene sheet or organic crystals.

The quantum-entangled state is one of the most basic features of quantum mechanics. The quantum-entangled state may be understood as a quantum state in which two or more particles overlap in a specific manner and that cannot be described as the product of wave functions of individual particles. To produce the quantum-entangled state, SPDC may be performed on a material having a nonlinear coefficient $\chi(2)$. In the present exemplary embodiment, the nonlinear material layer 151 including a graphene sheet or organic crystals is employed in the nonlinear optical element 150 that cause SPDC to occur. That is, the nonlinear material layer 151 causes SPDC to occur, together with the polar material layer 153. Although the nonlinear material layer 151 is illustrated as a graphene sheet, exemplary embodiments are not limited thereto.

Various light sources that generate laser light in the form of continuous waves or pulses may be used as the light source 110. For example, a He—Ne laser, Ar laser, or He—Cd laser may be employed as the light source 110. Also, a vertical cavity surface-emitting laser (VCSEL) may be used as a small-sized nano laser. A wavelength of light radiated from the light source 110 may be appropriately determined in consideration of a photon state converted into an encryption key, a wired or wireless transmission method used to distribute an encryption key, etc.

The polar material layer 153 may be formed of various materials, and may correspond to one of various types of substrates, such as, for example, a $SiO_2$ substrate.

A graphene sheet or organic crystals may be used as the nonlinear material layer 151.

The graphene sheet is a hexagonal single-layer structure formed of carbon, and shows a metal behavior since the mobility of electrons is very high in the graphene sheet. A near field may be generated at a surface of the graphene sheet when light is incident on the graphene sheet. Also, the graphene sheet may have a nonlinear coefficient $\chi(2)$, and SPDC may thus occur in the graphene sheet when a photon is incident thereon.

It has been reported that organic crystals may exhibit nonlinear optical features due to electrons delocalized in a $\pi$-$\pi^*$ orbital. L-Arginine maleate dihydrate (LAMD) or L-methionine L-methioninium hydrogen maleate (LMMM) may be used as the organic crystals.

Referring to FIG. 2A, when photons are incident on the nonlinear optical element 150, SPDC occurs and thereby causes some of the incident photons to be converted into a pair of photons with a relatively low oscillation frequency. Light incident on the nonlinear optical element 150 will be referred to as pump light, and two photons generated due to an interaction between the incident light and the nonlinear optical element 150 will be referred to as a signal photon and an idler photon, hereinafter.

As illustrated in FIGS. 2B and 2C, momentum conservation and energy conservation are satisfied between a pump photon and photons that are down-converted in the nonlinear optical element 150, as follows:

$$k_{PUMP} = k_s + k_i$$

$$\varphi_{PUMP} = \varphi_s + \varphi_i$$

The momentums and oscillation frequencies of a pair of photons generated by the nonlinear optical element 150, e.g., the signal photon and the idler photon, are correlated with each other according to the relation expressed in the above equations. Thus, when a signal photon having an arbitrary oscillation frequency and wave vector is generated, an idler photon having an oscillation frequency and wave vector corresponding to those of the signal photon occurs.

The signal photon and the idler photon generated by the nonlinear optical element 150 may form a polarization entangled state that may be expressed as follows:

$$|\psi> = \frac{1}{\sqrt{2}}(|H>|V> + |V>|H>),$$

wherein "|H>" and "|V>" denote a horizontal polarization state and a vertical polarization state, respectively.

Otherwise, the signal photon and the idler photon generated by the nonlinear optical element 150 may form a frequency-entangled state that may be expressed as follows:

$$|\psi> = \frac{1}{\sqrt{2}}(|\omega_1>|\omega_2> + |\omega_2>|\omega_1>)$$

Otherwise, when the signal photon and the idler photon generated by the nonlinear optical element 150 interact with an additional interferometer configured to select different paths, e.g., a short path s and a relatively long path l which is longer than the short path s, a time-energy entangled state may be realized. The time-energy entangled state may be expressed as follows:

$$|\psi> = \frac{1}{\sqrt{2}}(|s>|l> + |l>|s>)$$

According to an exemplary embodiment, a graphene sheet or organic crystals are suggested as a nonlinear material that causes SPDC to occur on a plane together with the polar material layer 153.

Various elements that may be used as the polar material layer 153 and exemplary embodiments of a photon pair generator will be described below.

Figure 3:
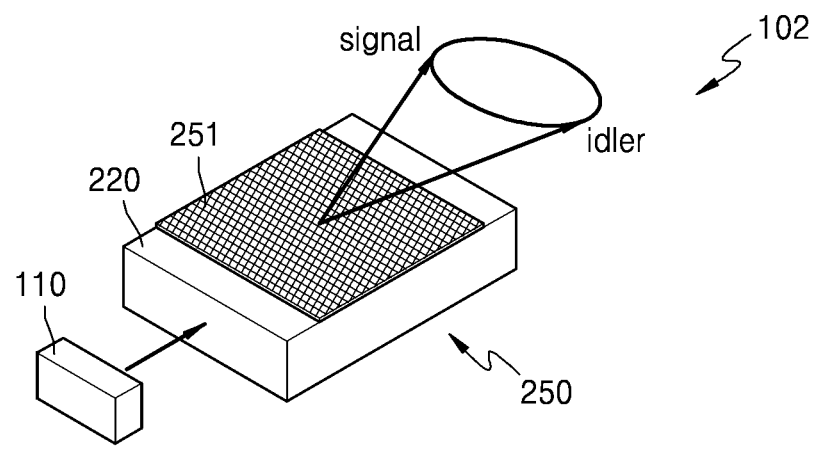
FIG. 3 is a diagram illustrating a schematic structure of a photon pair generator according to another exemplary embodiment.

FIG. 3 is a diagram illustrating a schematic structure of a photon pair generator 102 according to another exemplary embodiment.

The photon pair generator 102 includes a light source 110 and a nonlinear optical element 250. The nonlinear optical element 250 includes a substrate 220 and a nonlinear material layer 251 formed on the substrate 220.

The substrate 220 may be formed of various polar materials. For example, the substrate 220 may be formed of insulating materials such as $SiO_2$, as well as glass, quartz, various plastic materials, semiconductor materials, polymer materials, etc. The semiconductor materials may include, for example, Si, Ge, GaAs, GaN, etc. The polymer materials may include an organic polymer and an inorganic polymer.

The nonlinear material layer 251 may be formed on a surface of the substrate 220. The nonlinear material layer 251 may be a graphene sheet or organic crystals. For example, a transfer method may be used to form a graphene sheet on the substrate 220. That is, graphene may be grown on a metal thin film formed of, for example, copper (Cu) or nickel (Ni), by chemical vapor deposition (CVD) or grown by thermally decomposing a SiC substrate, and may be then transferred onto the substrate 220 by using a thermal release tape or poly methyl methacrylate (PMMA). Thereafter, the thermal release tape or PMMA is removed.

The substrate 220 is formed of a material with a refractive index larger than 1. Thus, a portion of light having an angle of incidence which satisfies a total reflection condition among light incident into the substrate 220 may be totally reflected and propagate inside the substrate 220. Another portion of the light having an angle of incidence which does not satisfy the total reflection condition may be emitted out of the substrate 220. In this case, SPDC occurs in some photons passing through the nonlinear material layer 251 formed on the substrate 220 to generate signal photons and idler photons.

Since a signal photon and an idler photon are generated when a photon interacts with the nonlinear material layer 251 while propagating inside the substrate 220, a nonlinear interaction length may increase to improve the efficiency of the SPDC.

Although the nonlinear material layer 251 is illustrated as being formed only on a top surface of the substrate 220, exemplary embodiments are not limited thereto and the nonlinear material layer 251 may be formed to extend to a side surface of the substrate 220.

Figure 4:
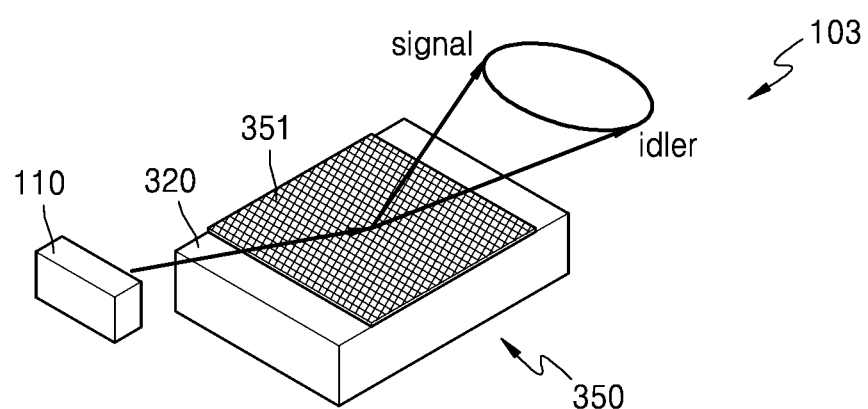
FIG. 4 is a diagram illustrating a schematic structure of a photon pair generator according to another exemplary embodiment.

FIG. 4 is a diagram illustrating a schematic structure of a photon pair generator 103 according to another exemplary embodiment.

The photon pair generator 103 includes a light source 110 and a nonlinear optical element 350. The nonlinear optical element 350 includes a metal layer 320 and a nonlinear material layer 351 formed on the metal layer 320.

The metal layer 320 may be formed of copper (Cu) or nickel (Ni), or may be formed of a metal catalyst material appropriate for growing graphene.

In this case, the light source 110 may be provided such that light is diagonally incident on a top surface of the nonlinear material layer 351. Light incident on the nonlinear material layer 351 may be reflected from the nonlinear material layer 351 or may pass through the nonlinear material layer 351 and may be then reflected from the metal layer 320. In this case, SPDC may occur in some photons passing through the nonlinear material layer 351 to generate signal photons and idler photons.

A graphene sheet or organic crystals may be used as the nonlinear material layer 351. In the present exemplary embodiment, when a graphene sheet is employed as the nonlinear material layer 351, the nonlinear material layer 351 may be directly formed on the metal layer 320 in the form of a graphene sheet by using the metal layer 320 as a catalyst for growing graphene.

Figure 5:
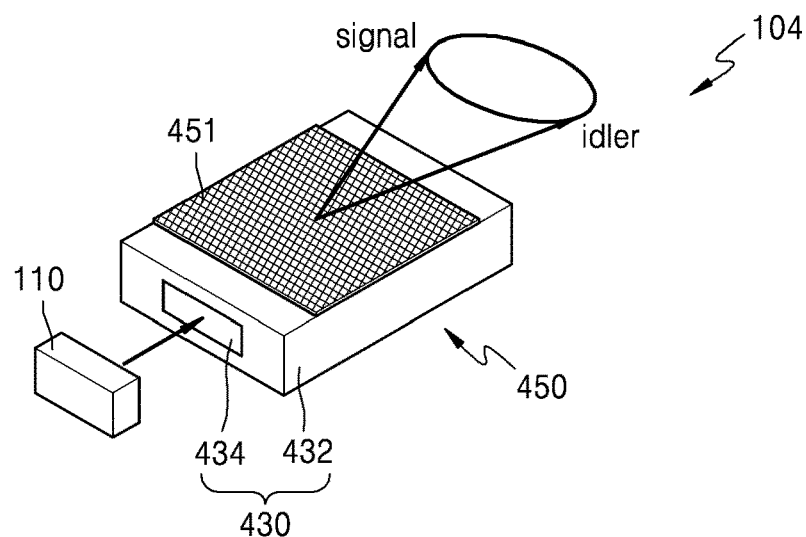
FIG. 5 is a diagram illustrating a schematic structure of a photon pair generator according to another exemplary embodiment.

FIG. 5 is a diagram illustrating a schematic structure of a photon pair generator 104 according to another exemplary embodiment.

The photon pair generator 104 includes a light source 110 and a nonlinear optical element 450. The nonlinear optical element 450 includes a waveguide 430 and a nonlinear material layer 451 formed on an external surface of the waveguide 430.

The waveguide 430 includes a core portion 434 and a cladding portion 432 surrounding the core portion 434. The core portion 434 and the cladding portion 432 may be formed of dielectric materials with different refractive indexes. The refractive index of the core portion 434 may be greater than the refractive index of the cladding portion 432. A portion of light having an angle of incidence which satisfies the total reflection condition among light incident on the core portion 434 is totally reflected at an interface between the core portion 434 and the cladding portion 432 and then propagates inside the waveguide 430. Another portion of the light having an angle of incidence which does not satisfy the total reflection condition may satisfy the total reflection condition at an interface between the cladding portion 432 and the nonlinear material layer 451, and propagate inside the waveguide 430. Some light may pass through the core portion 434 and the cladding portion 432 and then be incident on the nonlinear material layer 451, and SPDC may occur in some photons incident on the nonlinear material layer 451 to generate signal photons and idler photons.

Since the signal photons and the idler photons are generated when the photons propagate inside the waveguide 430 and interact with the nonlinear material layer 451, a nonlinear interaction length may increase to improve the efficiency of the SPDC.

Figure 6:
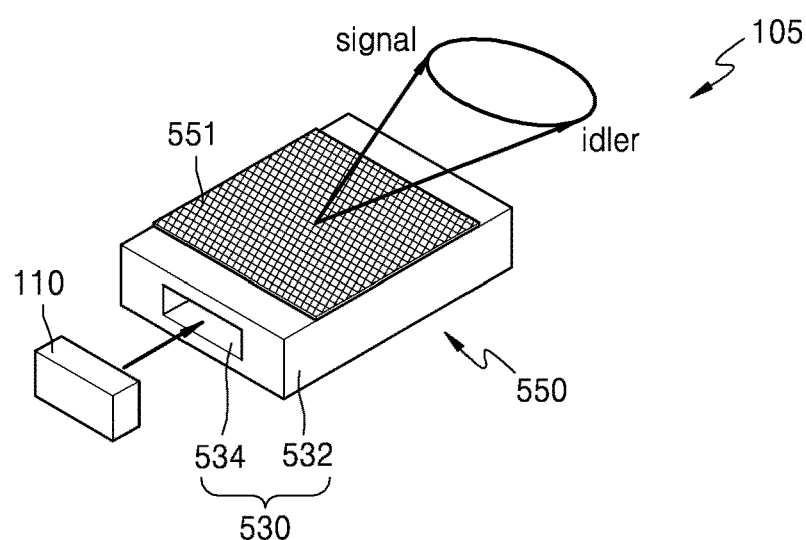
FIG. 6 is a diagram illustrating a schematic structure of a photon pair generator according to another exemplary embodiment.

FIG. 6 is a diagram illustrating a schematic structure of a photon pair generator 105 according to another exemplary embodiment.

The photon pair generator 105 includes a light source 110 and a nonlinear optical element 550. The nonlinear optical element 550 includes a waveguide 530 and a nonlinear material layer 551 formed on an external surface of the waveguide 530.

The waveguide 530 includes a cladding portion 532 in which an internal cavity 534 is formed. The internal cavity 534 may be an empty space (e.g., a space filled with air). Otherwise, the internal cavity 534 may be a space filled with a material with a lower refractive index than a refractive index of the cladding portion 532.

A graphene sheet or organic crystals may be used as the nonlinear material layer 551.

A portion of light satisfying the total reflection condition at an interface between the cladding portion 532 and the outside among light incident into the internal cavity 534 is totally reflected and propagates inside the waveguide 530. The other portion of the light that does not satisfy the total reflection condition passes through the cladding portion 532 and is incident on the nonlinear material layer 551. SPDC may occur in some photons incident on the nonlinear material layer 551 to generate signal photons and idler photons.

Figure 7:
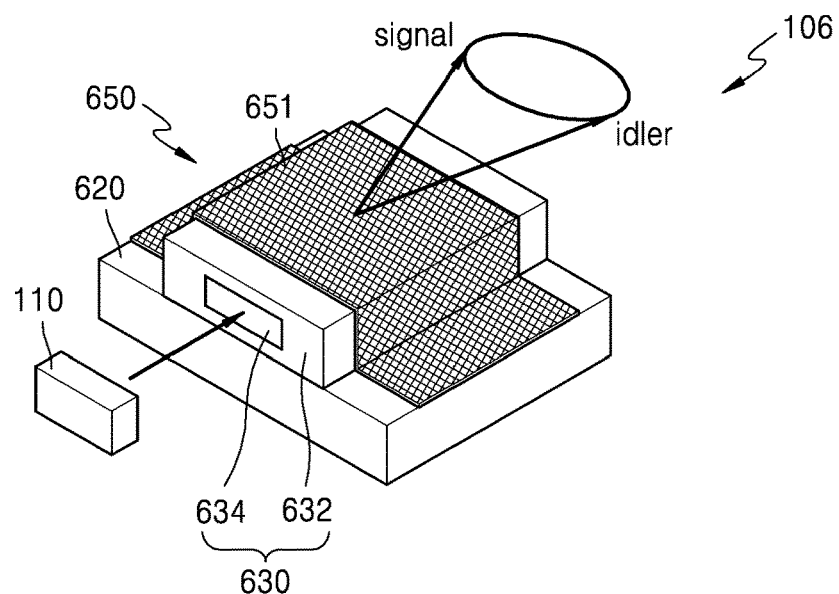
FIG. 7 is a diagram illustrating a schematic structure of a photon pair generator according to another exemplary embodiment.

FIG. 7 is a diagram illustrating a schematic structure of a photon pair generator 106 according to another exemplary embodiment.

The photon pair generator 106 includes a light source 110 and a nonlinear optical element 650. The nonlinear optical element 650 includes a substrate 620, a waveguide 630 formed on the substrate 620, and a nonlinear material layer 651 formed along a top surface of the substrate 620 and external side surfaces of the waveguide 630. That is, the nonlinear material layer 651 is formed to connect a first part of the top surface of the substrate 620, an external side surface of the waveguide 630, a top surface of the waveguide 630, another external side surface of the waveguide 630 opposite the external surface, and a second part of the top surface of the substrate 620. However, exemplary embodiments are not limited thereto and the nonlinear material layer 651 may not be continuously formed on all these surfaces. Also, the nonlinear material layer 651 may not be formed on some of these surfaces, or may be formed in many other ways. Further, the nonlinear material layer 651 may extend to side surfaces of the substrate 620. A graphene sheet or organic crystals may be used as the nonlinear material layer 651.

The substrate 620 may be formed of various materials, and may be formed of, for example, the material used to form the substrate 220 of the photon pair generator 102 of FIG. 3.

The waveguide 630 may include a core portion 634 and a cladding portion 632. The core portion 634 and the cladding portion 632 may be formed of dielectric materials with different refractive indexes. The refractive index of the core portion 634 may be greater than the refractive index of the cladding portion 632. The waveguide 630 may have the same structure as the waveguide 430 employed in the photon pair generator 105 of FIG. 5.

Figure 8:
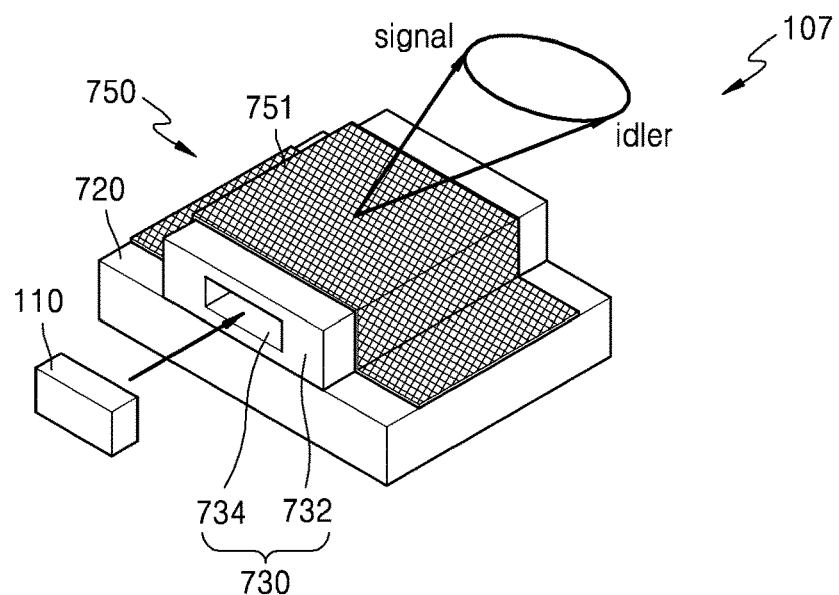
FIG. 8 is a diagram illustrating a schematic structure of a photon pair generator according to another exemplary embodiment.

FIG. 8 is a diagram illustrating a schematic structure of a photon pair generator 107 according to another exemplary embodiment.

The photon pair generator 107 includes a light source 110 and a nonlinear optical element 750. The nonlinear optical element 750 includes a substrate 720, a waveguide 730 formed on the substrate 720, and a nonlinear material layer 751 formed along a top surface of the substrate 720 and external side surfaces of the waveguide 730.

The photon pair generator 107 according to the present exemplary embodiment is different from the photon pair generator 106 of FIG. 7 in that the waveguide 730 includes a cladding portion 732 in which an internal cavity 734 is formed. The internal cavity 734 may be an empty space (e.g., a space filled with air), or a space filled with a material having a lower refractive index than a refractive index of the cladding portion 732.

The photon pair generators 101, 102, 103, 104, 105, 106, and 107 described above may be in the form of an integrated all-in-one chip, and may be configured to be easily applied to an integrated photonic circuit. Since the nonlinear material layers 151, 251, 351, 451, 551, 651, and 751 in which SPDC may occur on a two-dimensional (2D) plane are employed in the nonlinear optical elements 150, 250, 350, 450, 550, 650, and 750, the nonlinear optical elements 150, 250, 350, 450, 550, 650, and 750 may be minimized in terms of a spatial volume thereof. For example, a quantum cryptographic device may be formed as a small-sized chip having a size of about 5 cm×5 cm×1 mm or less.

The photon pair generators 101, 102, 103, 104, 105, 106, and 107 described above may be employed in various electronic devices to which SPDC is applicable. For example, since incident light is emitted after a wavelength thereof is changed through SPDC, the photon pair generators 101, 102, 103, 104, 105, 106, and 107 may be used as a tunable laser together with a laser light source.

Also, the photon pair generators 101, 102, 103, 104, 105, 106, and 107 described above may be employed in various electronic devices for which cryptic code needs to be generated and distributed. Examples of the electronic devices include smartphones, mobile phones, personal digital assistants (PDAs), laptop computers, media players, personal computers (PCs), and mobile/non-mobile computing devices, but it is understood that the types of electronic devices in which the photon pair generators 101, 102, 103, 104, 105, 106, and 107 may be employed are not limited thereto.

Figure 9:
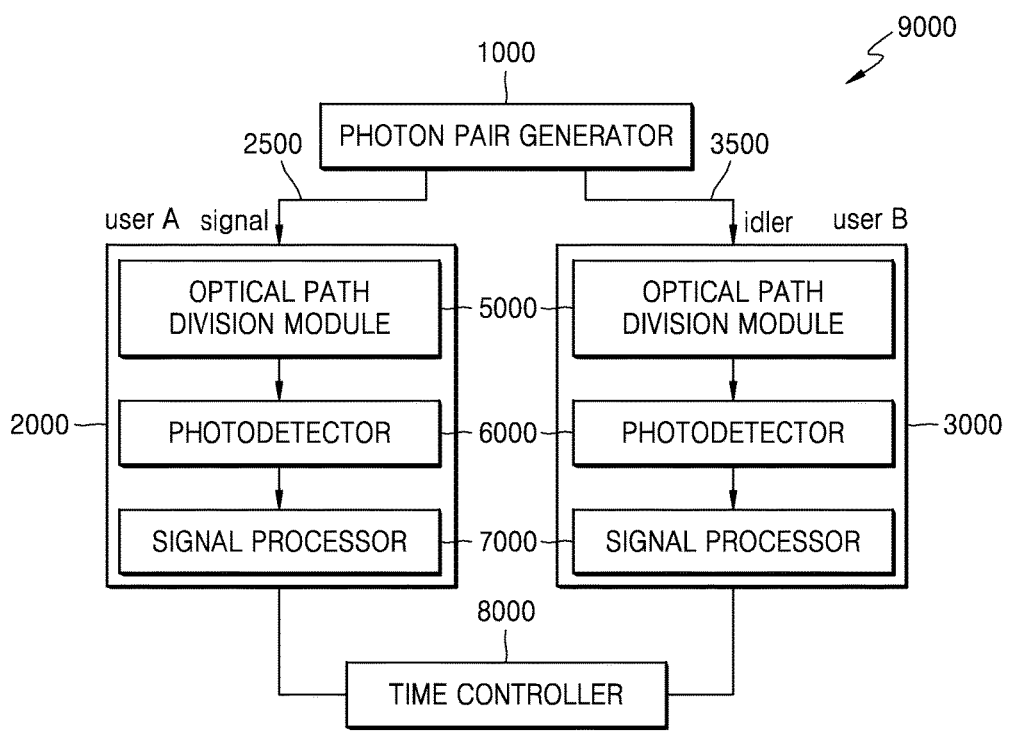
FIG. 9 is a block diagram illustrating a schematic structure of a quantum cryptographic system according to an exemplary embodiment.
Figure 10:
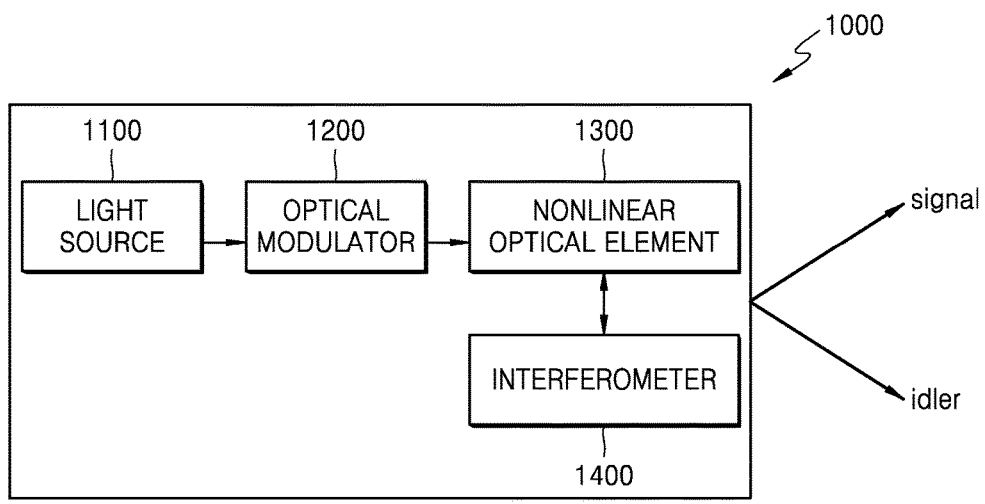
FIG. 10 is a block diagram of a photon pair generator employed in the quantum cryptographic system of FIG. 9 according to an exemplary embodiment.
Figure 11:
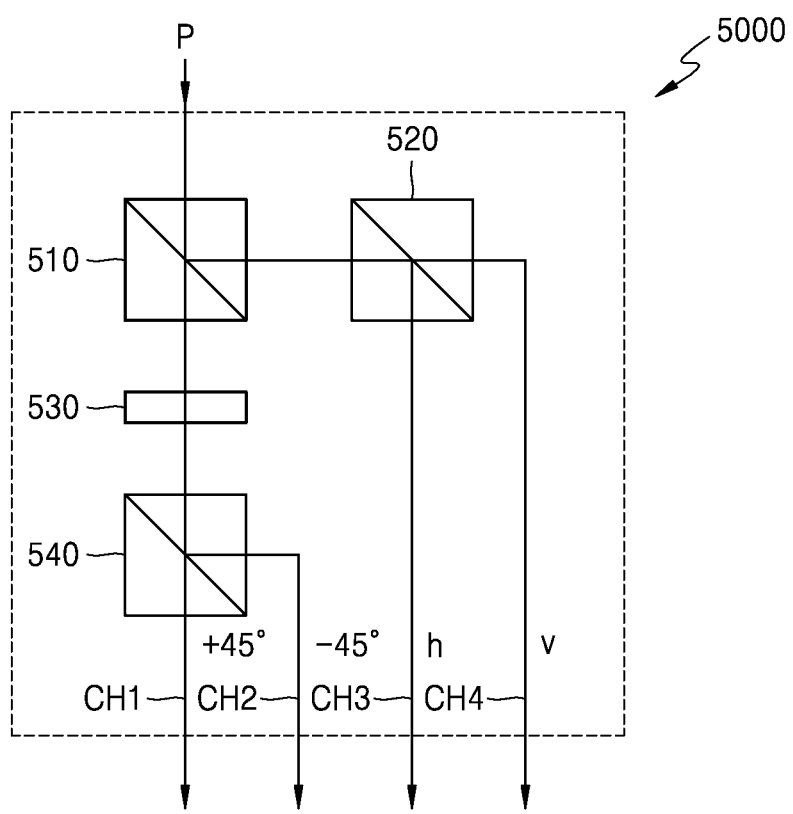
FIG. 11 illustrates a structure of an optical path division module employed in the quantum cryptographic system of FIG. 9 according to an exemplary embodiment.

FIG. 9 is a block diagram illustrating a schematic structure of a quantum cryptographic system 9000 according to an exemplary embodiment. FIG. 10 is a block diagram of a photon pair generator 1000 employed in the quantum cryptographic system 9000 of FIG. 9 according to an exemplary embodiment. FIG. 11 illustrates a structure of an optical path division module 5000 employed in the quantum cryptographic system 9000 of FIG. 9 according to an exemplary embodiment.

Referring to FIG. 9, the quantum cryptographic system 9000 includes the photon pair generator 1000, and a first measuring system 2000 and a second measuring system 3000 to which a signal photon and an idler photon that are a pair of photons generated by the photon pair generator 1000 are respectively distributed. The signal photon and the idler photon may be transmitted to the first measuring system 2000 and the second measuring system 3000 via a first transmission line 2500 and a second transmission line 3500, respectively, but are not limited thereto and may be transmitted in other ways as well, such as, for example, in a wireless manner.

The quantum cryptographic system 9000 is a system that generates symmetric cryptic codes and distributes the symmetric cryptic codes to two users (e.g., a user A and a user B) who may be far apart from each other. An encryption key may be securely distributed between two systems by precisely measuring a quantum-entangled photon pair, which is generated by the photon pair generator 1000, through the first measuring system 2000 of the user A and the second measuring system 3000 of the user B.

The photon pair generator 1000 may include a nonlinear optical element with a graphene sheet, and may correspond to one of the above photon pair generators 101, 102, 103, 104, 105, 106, and 107 according to various exemplary embodiments.

As illustrated in FIG. 10, the photon pair generator 1000 may further include additional optical elements such as an optical modulator 1200 and an interferometer 1400. That is, the photon pair generator 1000 may include a light source 1100, the optical modulator 1200 that modulates light radiated from the light source 1100, a nonlinear optical element 1300 that generates a pair of photons from incident light through SPDC, and the interferometer 1400 that controls a quantum-entangled state of a photon pair generated by the nonlinear optical element 1300.

The optical modulator 1200 may be a device that periodically blocks light to convert light radiated from the light source 110 into a pulse signal. For example, the optical modulator 1200 may be an electric or mechanical chopper. When pulse type light is radiated from the light source 1110, the optical modulator 1200 may be omitted.

The nonlinear optical element 1300 includes a graphene sheet and may be one of the nonlinear optical elements 150, 250, 350, 450, 550, 650 and 750 of the photon pair generators 101, 102, 103, 104, 105, 106, and 107 according to the previous exemplary embodiments.

The interferometer 1400 is an optical system that controls the quantum-entangled state of a photon pair generated by the nonlinear optical element 1300. For example, the quantum-entangled photon pair may be controlled such that a long path may be selected for one photon among the photon pair and a short path may be selected for the other photon among the photon pair. Examples of the interferometer 1400 may include a beam splitter, a reference mirror, etc., but the exemplary embodiments are not limited thereto.

Due to the above structure, the photon pair generator 1000 may generate a polarization-entangled photon pair, a frequency-entangled photon pair, or a time-energy entangled photon pair.

Referring back to FIG. 9, the first measuring system 2000 and the second measuring system 3000 may each include the optical path division module 5000 that divides a path of an incident photon, a photodetector 6000 that detects a photon passing through the optical path division module 5000, and a signal processor 7000 that selects a bit value corresponding to a result of detecting a photon by using the photodetector 6000.

FIG. 11 illustrates a structure of the optical path division module 5000 according to an exemplary embodiment. The optical path division module 5000 divides an optical path according to a state of an incident photon P so that the photon P may be sensed in a different region of the photodetector 6000 of FIG. 10 based on the state of the photon P. Referring to FIG. 11, the optical path division module 5000 includes a beam splitter 510, a first polarization beam splitter 520, a second polarization beam splitter 540, and a half-wave plate 530.

The beam splitter 510 may be a half-mirror that splits incident light so that the light is transmitted along two paths, for example, transmits a half of the incident light therethrough and reflects the other half. The beam splitter 510 is configured to split incident light regardless of a polarization of the light. The two portions of light split from the light by the beam splitter 510 may have the same polarization state. A portion of the light which is refracted by the beam splitter 510 may be, for example, a mixture of vertical polarized light (90° polarized light) and horizontal polarized light (0° polarized light). A polarization axis of the first polarization beam splitter 520 is configured such that light is split into vertical polarized light and horizontal polarized light. Thus, light passing through the first polarization beam splitter 520 is split into vertical polarized light and horizontal polarized light that propagate in different paths. That is, the vertical polarized light propagates toward a fourth photon channel CH4, and the horizontal polarized light propagates toward a third photon channel CH3.

Light that is split by the beam splitter 510 and incident on the half-wave plate 530 is a mixture of vertical polarized light and horizontal polarized light, similar to light incident on the first polarization beam splitter 520. When such light passes through the half-wave plate 530, the light is converted into 45° polarized light and −45° polarized light. A polarization axis of the second polarization beam splitter 540 is configured to split the 45° polarized light and the −45° polarized light. Thus, light passing through the second polarization beam splitter 540 is split into 45° polarized light and −45° polarized light that propagate in different paths. That is, the 45° polarized light propagates toward the first photon channel CH1, and the −45° polarized light propagates toward the second photon channel CH2.

Due to the above structure of the optical path division module 5000, only photons that are in a 45° polarized state, a −45° polarized state, a horizontal polarized state h, and a vertical polarized state v may pass first, second, third and fourth photon channels CH1, CH2, CH3, and CH4, respectively.

An example of a structure of the optical path division module 5000 in which a plurality of proton channels are formed to measure states of photons has been described above. Of course, it is understood that the optical path division module 5000 may have various other structures which would be appreciated by those of ordinary skill in the art.

When an idler photon is input to the first measuring system 2000, the idler photon passes through one of the first to fourth photon channels CH1, CH2, CH3, and CH4 and is then detected by the photodetector 6000, and bit values are selected by the signal processor 7000 based on a result of detecting the idler photon.

The same optical path division module 5000 may be included in the first measuring system 2000 and the second measuring system 3000, and a signal photon and an idler photon, which are a quantum-entangled photon pair corresponding to each other, are incident on the first measuring system 2000 and the second measuring system 3000, respectively. Thus, when a bit sequence is generated by the first measuring system 2000, a bit sequence corresponding to the generated bit sequence is generated by the second measuring system 3000.

Various types of photosensors capable of sensing light and generating an electric signal may be employed as the photodetector 6000. The photodetector 6000 may have sensitivity appropriate for sensing light corresponding to a single photon level. For example, the photodetector 6000 may include an avalanche photodiode (APD). For example, a gated InGaAs APD may be used as the photodetector 6000.

As described above, the signal processor 7000 generates a bit sequence by selecting bit values to be used as an encryption key based on a result of detection performed by the photodetector 6000. As a result, a post-processing process such as error correction or privacy amplification may be further performed.

A time controller 8000 may be installed between the signal processor 7000 of the first measuring system 2000 and the signal processor 7000 of the second measuring system 3000. The first measuring system 2000 may be a system of a local user, and the second measuring system 3000 may be a system of a remote user. In this case, a time delay may occur between a signal photon transmitted to the first measuring system 2000 and an idler photon transmitted to the second measuring system 3000. Thus, timing control may be performed such that the signal photon and the idler photon are measured by the first measuring system 2000 and the second measuring system 3000 and the same bit values are selected as results of detecting the signal photon and the idler photon. For example, the time controller 8000 may be configured to transmit a trigger pulse to the second measuring system 3000 at the moment a photon is detected by the first measuring system 2000.

The quantum cryptographic system 9000 described above is a system for distributing cryptic code between two users, and the first measuring system 2000 and the second measuring system 3000 may be installed in a first electronic device and a second electronic device, respectively. For example, the first measuring system 2000 and the photon pair generator 1000 may be installed in the first electronic device, and the second measuring system 3000 may be installed in the second electronic device spaced apart from the first electronic device.

The first electronic device and the second electronic device may be implemented as various electronic devices for which cryptic codes should be generated and distributed. Examples of these electronic devices may include smartphones, mobile phones, PDAs, laptop computers, media players, PCs, and mobile/non-mobile computing devices, but are not limited thereto.

As described above, since the photon pair generators according to the one or more of the above exemplary embodiments have a structure in which SPDC may occur on a plane, the size thereof may be thus easily reduced and the efficiency of the SPDC may be high.

The photon pair generators described above may be easily embodied as small-sized integrated photonic chips, and employed in various electronic devices which use a quantum cryptographic system.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While photon pair generators and a quantum cryptographic system according to one or more exemplary embodiments have been described with reference to the figures, it will be understood by those of ordinary skill in the art that various changes in form and details may be made therein without departing from the spirit and scope as defined by the following claims.

What is claimed is:

1. A photon pair generator comprising:
   a light source configured to emit light; and
   a nonlinear optical element configured to receive the light radiated from the light source and generate a quantum-entangled photon pair through spontaneous parametric down-conversion (SPDC), the nonlinear optical element comprising a polar material layer and a nonlinear material layer provided on the polar material layer,
   wherein the nonlinear material layer comprises a graphene sheet and SPDC occurs on a two-dimensional plane on which the graphene sheet is disposed, and
   wherein the polar material layer comprises a waveguide, the wave guide comprising one of a first waveguide and a second waveguide,
   the first wave guide comprising:
      a core portion; and
      a cladding portion having a refractive index that is less than a refractive index of the core portion, and surrounding the core portion, and
   the second wave guide comprising:
      a cladding portion forming an internal cavity, the internal cavity being filled with a material with a refractive index that is lower than the refractive index of the cladding portion.

2. The photon pair generator of claim 1, wherein the polar material layer comprises:
   a substrate; and
   the one of the first waveguide and the second waveguide is provided on a portion of a surface of the substrate,
   wherein the nonlinear material layer is provided along portions of the surface of the substrate other than the portion of the surface of the substrate on which the one of the first waveguide and the second waveguide is formed, and is further provided along external surfaces of the one of the first waveguide and the second waveguide.

3. The photon pair generator of claim 1, wherein the light source comprises a vertical cavity surface-emitting laser.

4. The photon pair generator of claim 1, wherein the light source and the nonlinear optical element are integrally formed in an integrated all-in-one chip.

5. An electronic device, comprising:
a photon pair generator comprising:
  a light source configured to emit light; and
  a nonlinear optical element configured to receive the light radiated from the light source and generate a quantum-entangled photon pair through spontaneous parametric down-conversion (SPDC), the nonlinear optical element comprising a polar material layer and a nonlinear material layer provided on the polar material layer,
wherein the nonlinear material layer comprises a graphene sheet and SPDC occurs on a two-dimensional plane on which the graphene sheet is disposed,
wherein the polar material layer comprises a waveguide, the wave guide comprising one of a first waveguide and a second waveguide,
the first wave guide comprising:
  a core portion; and
  a cladding portion having a refractive index that is less than a refractive index of the core portion, and surrounding the core portion, and
the second wave guide comprising:
  a cladding portion forming an internal cavity, the internal cavity being filled with a material with a refractive index that is lower than the refractive index of the cladding portion.

6. A quantum cryptographic system comprising:
a photon pair generator comprising:
  a light source configured to emit light; and
  a nonlinear optical element configured to receive the light radiated from the light source and generate a quantum-entangled photon pair comprising a first photon and a second photon through spontaneous parametric down-conversion (SPDC), the nonlinear optical element comprising a polar material layer and a nonlinear material layer provided on the polar material layer, wherein the nonlinear material layer comprises a graphene sheet and spontaneous parametric down-conversion (SPDC) occurs on a two-dimensional plane on which the graphene sheet is disposed, wherein the polar material layer comprises a waveguide, the wave guide comprising one of a first waveguide and a second waveguide,
the first wave guide comprising:
  a core portion; and
  a cladding portion having a refractive index that is less than a refractive index of the core portion, and surrounding the core portion, and
the second wave guide comprising:
  a cladding portion forming an internal cavity, the internal cavity being filled with a material with a refractive index that is lower than the refractive index of the cladding portion; and
a first measuring system, implemented by at least one hardware processor, and a second measuring system, implemented by at least one hardware processor, configured to receive the first photon and the second photon, respectively.

7. The quantum cryptographic system of claim 6, wherein each of the first measuring system and the second measuring system comprises:
  an optical path divider configured to divide paths of incident photons;
  a photodetector configured to detect a photon being transmitted along one of the divided paths, and thereby generate a detection result; and
  a hardware signal processor configured to generate a bit sequence by selecting bit values corresponding to the detection result generated by the photodetector.

8. The quantum cryptographic system of claim 7, wherein the photodetector comprises an avalanche photodiode.

9. The quantum cryptographic system of claim 6, wherein the photon pair generator further comprises an optical modulator provided between the light source and the nonlinear optical element and configured to modulate the light emitted from the light source.

10. The quantum cryptographic system of claim 6, wherein the photon pair generator further comprises an interferometer configured to control an entangled state of the quantum-entangled photon pair generated by the nonlinear optical element.

11. The quantum cryptographic system of claim 6, wherein the photon pair generator is further configured to generate a polarization-entangled photon pair.

12. The quantum cryptographic system of claim 6, wherein the photon pair generator is further configured to generate a frequency-entangled photon pair.

13. The quantum cryptographic system of claim 6, wherein the photon pair generator is further configured to generate a time-energy entangled photon pair.

14. The quantum cryptographic system of claim 6, wherein:
  the first measuring system is a system of a local user,
  the second measuring system is a system of a remote user, and
  the system further comprises a time controller configured to enable the first measuring system and the second measuring system to select same bit values with respect to the first photon and the second photon.

15. The quantum cryptographic system of claim 6, wherein the first measuring system and the photon pair generator are provided in a first electronic device, and
  the second measuring system is provided in a second electronic device spaced apart from the first electronic device.

* * * * *